United States Patent [19]

Miwa et al.

[11] Patent Number: 5,576,736
[45] Date of Patent: Nov. 19, 1996

[54] VISUALLY EFFECTIVE IMAGE SWITCHING APPARATUS

[75] Inventors: Katsuhiko Miwa, Neyagawa; Kazuhiro Tsuga, Takarazuka; Yoshihiro Mori, Hirakata; Yoshiitirou Kashiwagi, Kadoma, all of Japan

[73] Assignee: Matsushita Electric Industrial Co., Ltd., Osaka, Japan

[21] Appl. No.: 512,903

[22] Filed: Aug. 9, 1995

Related U.S. Application Data

[63] Continuation of Ser. No. 219,209, Mar. 29, 1994, abandoned.

[30] Foreign Application Priority Data

Mar. 29, 1993 [JP] Japan .................................. 5-069621

[51] Int. Cl.⁶ .................................................. G09G 1/02
[52] U.S. Cl. .......................... 345/189; 345/202; 345/115
[58] Field of Search .................................. 345/202, 185, 345/189, 190, 113, 114, 115, 116, 202; 358/426; 382/56, 233; 395/164, 166

[56] References Cited

U.S. PATENT DOCUMENTS

| | | | |
|---|---|---|---|
| 4,125,873 | 11/1978 | Chesarek | 345/202 |
| 4,868,781 | 9/1989 | Kimura et al. | 345/113 |
| 4,907,086 | 3/1990 | Truog | 345/113 |
| 5,129,011 | 7/1992 | Nishikawa et al. | 345/202 |
| 5,300,949 | 4/1994 | Rodriquez et al. | 345/202 |

FOREIGN PATENT DOCUMENTS

| | | |
|---|---|---|
| 63-197178 | 8/1988 | Japan . |
| 1-190176 | 7/1989 | Japan . |
| 3-267885 | 11/1991 | Japan . |

Primary Examiner—Kee Mei Tung
Assistant Examiner—Doon Chow
Attorney, Agent, or Firm—Ratner & Prestia

[57] ABSTRACT

A visually effective image switching apparatus includes a frame memory unit for storing image data for one picture and a decoder for expanding a compressed image data and for outputting the expanded image data. Also included is a graphic memory controller for writing the expanded image data outputted from the decoder directly in the frame memory unit. An I/O access unit is also provided for selecting whether the expanded image data is to be written or not written at the present address of the frame memory. A local bus unit is also provided for transferring the expanded image data to the graphic memory controller. The timing of the decoder, the graphic memory controller and the I/O access unit are controlled by a CPU unit.

6 Claims, 3 Drawing Sheets

VISUALLY EFFECTIVE IMAGE SWITCHING APPARATUS

This application is a continuation of application Ser. No. 08/219,209 filed Mar. 29, 1994, now abandoned.

BACKGROUND OF THE INVENTION

(1) Field of the Invention

The present invention relates to a visually effective image switching apparatus for producing an image switching special effect by synthesizing digital image data corresponding to two images. The images are synthesized when an image displayed on an image display device is switched with another image to be displayed.

(2) Description of the Prior Art

There are several examples of prior art devices, for example, "Special Effect Generating device, Japanese Patent Laid-Open 63-197178", "Video Signal Processor, Japanese Patent Laid-Open 1-190176", and "Video Special Effect Processing System, Japanese Patent Laid-Open 3-267885", each of which is incorporated herein by reference, which relate to special effect processing. Another example of a related prior art device is discussed in U.S. Pat. No. 4,197,590 entitled "Method for Dynamically Viewing Image Segments Stored in a Random Access Memory Array", which is incorporated herein by reference.

A conventional special effect generating apparatus for synthesizing two pictures has a temporary memory for storing at least two pictures of digital image data to be synthesized.

Each digital image data is read from the temporary memory. Then (1) the data is calculated for synthesis and D/A converted to an analog video signal of one frame, or (2) each image is D/A converted and then each image data is calculated for synthesis. The series of processing steps which generate a video signal of one frame is regarded as a unit. A unit is continually repeated to produce the special effect of synthesizing two images. A unit is the series of steps necessary to generate one frame of a video signal. When a unit is repeated successively, momentary variation can be added to the special effect which is obtained by switching the display picture. This is accomplished by changing or modifying the parameters and the method used to calculate the synthesis every time the steps are repeated to create a unit.

When the minimum time required to perform the processing steps for one unit is reduced, a smoother and more effective special effect by synthesizing two images is obtained.

For example, one frame of a television video signal is displayed every 1/30 second. As a result, a calculation device for synthesizing images must operate at a high speed. In addition, a temporary memory composed of semiconductor memory devices is also needed so that data can be supplied at a high rate of speed.

The digital image data is usually stored in an external storage device having a large capacity such as a filing unit. However, the amount of data in an image is generally large and the data reading speed of external storage devices having a large capacity is very slow as compared with that of a semiconductor memory device. As a result, a video signal of one frame cannot be generated at high speed, when using an external storage device without a buffering memory such as the temporary memory mentioned above. As a consequence, a smooth and effective special effect cannot be realized.

The temporary memory which is used as a buffer memory to store digital image data is, however, generally assembled as a frame memory unit. A frame memory unit is composed of expensive and large scale semiconductor integrated circuits. As a result, a special effect generating apparatus using the frame memory unit is expensive and large.

The image data for one picture is typically read according to a refresh frequency of the display device.

Moreover, if a dual port RAM which can read and write image data simultaneously is used, the expense and size of the special effect generating apparatus is increased. In contrast, if DRAMs are used, the expense and size of the apparatus is reduced.

SUMMARY OF THE INVENTION

The present invention relates to a low cost visually effective image switching apparatus which is reduced in size.

A visually effective image switching apparatus relating to the present invention includes:

a frame memory unit for storing image data for one picture, a decoder for expanding a compressed image data and for outputting the expanded image data, a graphic memory controller for writing the expanded image data outputted from the decoder directly in the frame memory unit, an I/O access unit in the graphic memory controller for selecting whether the data is to be written or not to be written at the present address of the frame memory, when the graphic memory controller writes the image data in the frame memory unit, a local bus unit for transferring the expanded image data to the graphic memory controller, and a CPU unit for controlling the timing of the decoder, the graphic memory controller and the I/O access unit.

The CPU unit is also for (1) expanding the compressed image data at the decoder, (2) writing the expanded image data in the frame memory unit through the graphic memory controller, (3) designating a writing region using the I/O access unit, when the image data is written in the frame memory unit, and (4) repeating the above process for at least one cycle.

The original image data which may be received by the present invention is a compressed image data.

According to the configuration above, an expanded image data signal is obtained if the digital compressed image data is inputted into the decoder. Expanded image data can be obtained as an output of the decoder by repeating this process at least one cycle for a single compressed image data.

The output of the decoder is inputted into the graphic memory controller through the local bus which transfers the expanded image data at a rapid rate.

The graphic memory controller writes the inputted image data into the frame memory unit. The stored image data is refreshable. The I/O access unit generates an address for the frame memory where the image data is stored. The writing function of the graphic memory controller may be synchronized or not synchronized with the writing function of the decoder. The I/O access unit controls the synchronization of the graphic memory controller with the decoder.

Although a high speed local bus unit is used for connecting the decoder and the graphic memory controller, the cost of the apparatus can still be minimized by restricting the use of the high speed bus to this connection.

In addition, the image data transfer rate from reading the compressed image data outputted from the external storage device to writing the image data in the frame memory unit can be maintained at a high rate of speed.

An input buffer for the graphic memory controller is unnecessary since the speed of the image data transfer rate to the graphic memory controller occurs at a sufficiently high speed.

In addition, an adequate synthesizing effect of switching images can be realized by writing the image data directly.

Further, since the buffering memory, which is usually a semiconductor memory device, can be eliminated, the size and cost of the apparatus can be limited.

Moreover, since the image data is written directly in a frame memory unit, a high speed digital signal processor operating at a high video rate is unnecessary. Therefore, the apparatus has a reduced size and cost. In addition, an increased amount of image data can be stored in the data storage media used for storing the compressed image data.

DETAILED DESCRIPTION OF THE INVENTION

First Exemplary Embodiment

Figure 1B:
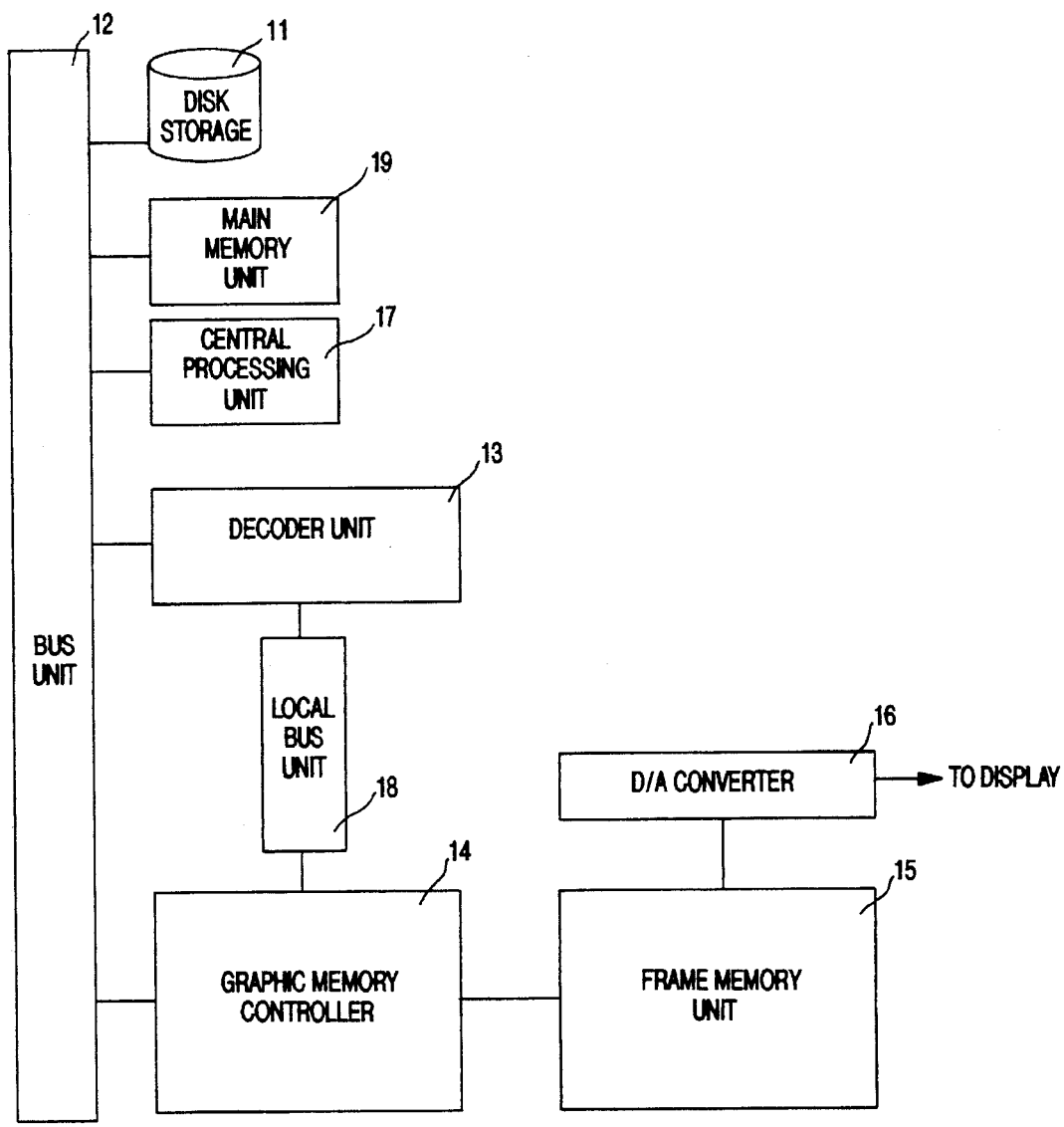
FIGS. 1a and 1b are block diagrams of a visually effective image switching apparatus in accordance with a first exemplary embodiment of the present invention.
Figure 1A:
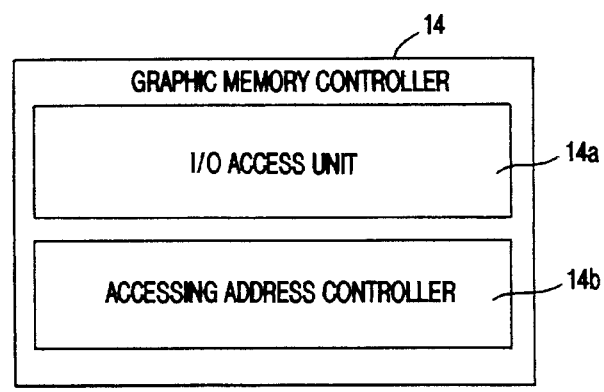

FIGS. 1a–1b are block diagrams of a visually effective image switching apparatus in accordance with a first exemplary embodiment of the present invention.

As shown in FIG. 1a, a graphic memory controller 14 comprises an I/O access unit 14a, a frame memory unit 15, and an accessing address controller 14b for controlling and accessing an address.

As shown in FIG. 1b, a local bus unit 18 connects a JPEG decoder unit 13 to the graphic memory controller 14. The data transferring speed of the local bus 18 is higher than that of a bus unit 12.

Compressed image data having a JPEG format is stored in a magneto-optical disk storage 11.

The JPEG compressed still image data stored in the magneto-optical disk storage 11 is transferred to the JPEG decoder unit 13 through bus unit 12. The JPEG decoder unit 13 executes expansion processing of the JPEG compressed still image data. The expanded still image data is outputted to the graphic memory controller 14 through the local bus unit 18.

The expanded still image data is to be written or not to be written into a region at an address of the frame memory unit 15 depending upon writing region information which is previously stored in a main memory unit 19. The frame memory unit 15 can store at least image data corresponding to one picture.

A CPU unit 17 provides the writing region information stored in the main memory unit 19 to the graphic memory controller 14 before expanding the compressed still image data at the JPEG decoder unit 13.

The graphic memory controller 14 activates the I/O access unit 14a and the accessing address controller 14b according to the writing region information. The graphic memory controller also writes the image data inputted from the JPEG decoder unit 13 into the frame memory unit 15.

The CPU unit 17 also controls timing for the system so that each unit discussed above performs their designated functions at the appropriate time.

An image synthesizing effect can be obtained by repeating at least one cycle and by changing or not changing the JPEG compressed still image data. Alternatively, the image synthesizing effect can also be obtained by repeating at least one cycle without changing or successively changing the writing region information. Thus, the special effect can be produced by either of the two methods. For example, the image synthesizing effect can be obtained (1) without changing the JPEG compressed still image data and with changing the writing region information; or (2) with changing the JPEG compressed still image data and without changing the writing region information, or (3) with changing the JPEG compressed still image data and without changing the writing region information. In addition, there could be one cycle of producing the special effect by not changing the JPEG compressed still image data or the writing region information.

The JPEG compressed still image data stored in the magneto-optical disk storage 11 can be rapidly transferred from the magneto-optical disk 11 even though the data transferring speed of bus unit 12 of the computer is slow because the image data is in the JPEG compressed format. In contrast, the transfer rate for an uncompressed image is slower.

High speed semiconductor LSIs can be used in JPEG decoder unit 13. In addition, by using a local high speed bus unit such as the local bus unit 18, a high transfer rate of image data from the magneto-optical disk storage 11 to the graphic memory controller 14 may be realized at comparatively low cost.

Therefore, a practical image synthesizing effect is obtained by using one frame memory for one picture. This is accomplished without using a memory unit which can input and output data at high speed such as a separate frame memory for buffering the image data to be written into the frame memory.

Second Exemplary Embodiment

FIGS. 2a–2d are block diagrams of a visually effective image switching apparatus in accordance with a second exemplary embodiment of the present invention.

Figure 2A:
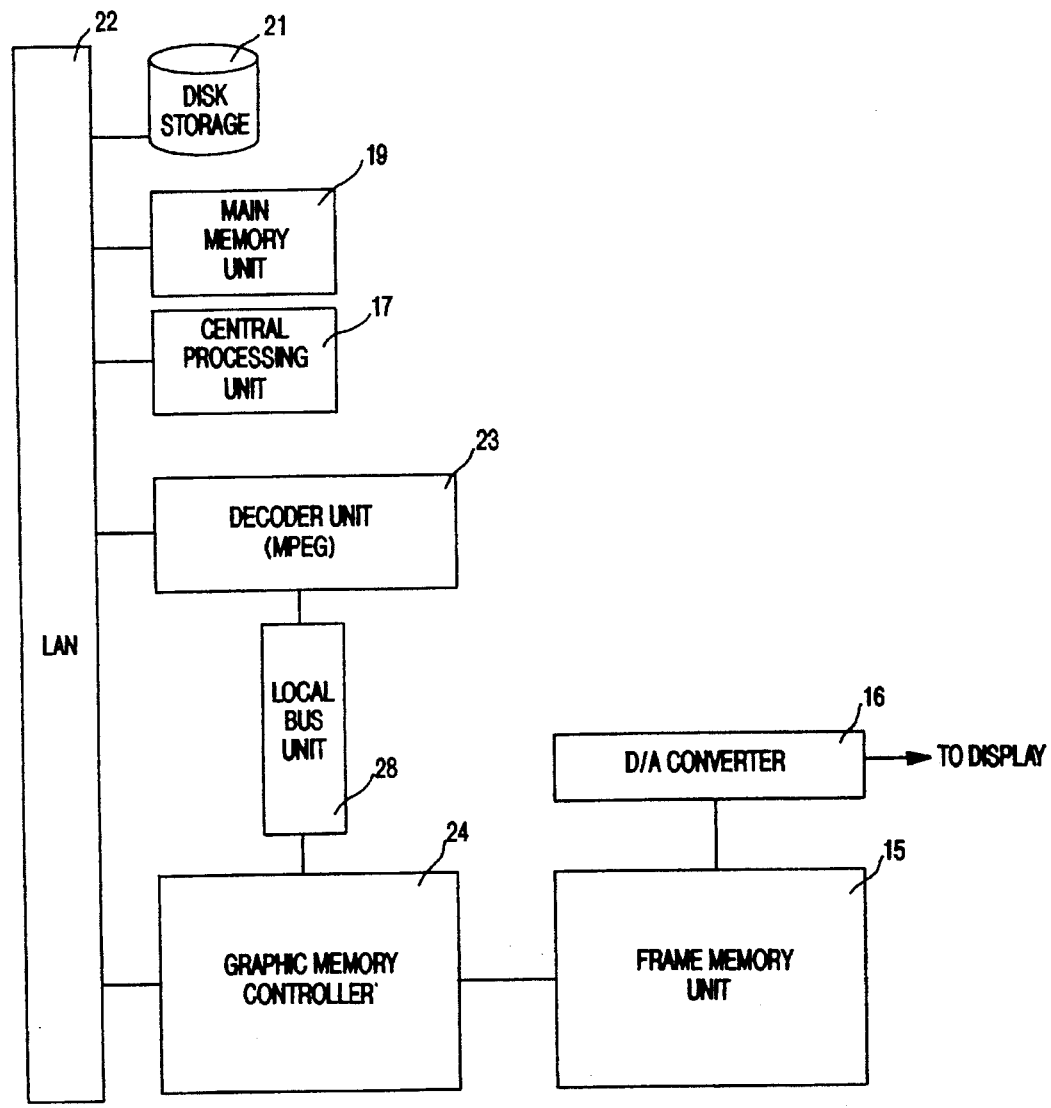
FIGS. 2a–2d are block diagrams of a visually effective image switching apparatus in accordance with a second exemplary embodiment of the present invention.

The frame memory unit 15, a D/A converter 16, PU unit 17 and main memory unit 19 as shown in FIG. 2a are similar to the units of the first exemplary embodiment of the present invention.

Figure 2B:
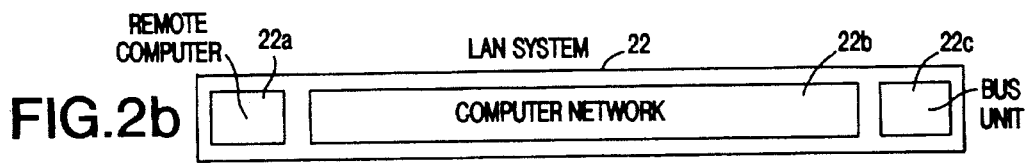

The second exemplary embodiment, as shown in FIG. 2b, also includes a LAN system 22 which includes a remote computer 22a connected to the hard disk storage 21, a computer network 22b and a bus unit 22c of a host computer.

Figure 2C:
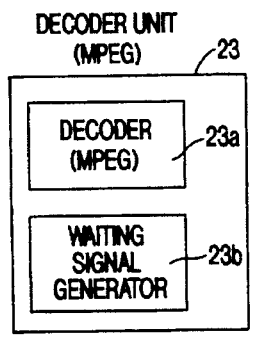

Also provided is a MPEG decoder unit 23 which comprises a MPEG decoder 23a and a waiting signal generator 23b, as shown in FIG. 2c.

Figure 2D:
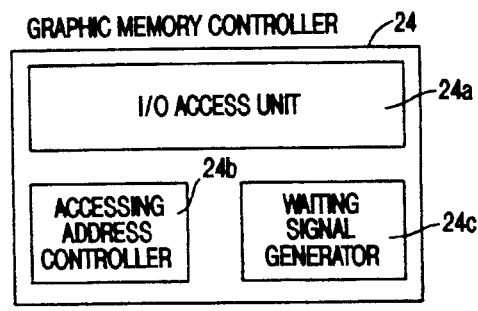

In addition, a graphic memory controller 24 is provide. The graphic memory controller comprises an I/O access unit 24a connected to the frame memory unit 15, and an accessing address controller 24b and an waiting signal generator 24c as shown in FIG. 2d.

A local bus unit 28 transfers data at a sufficiently higher speed than the LAN system 22. The local bus unit 28 is connected between the MPEG decoder unit 23 and the graphic memory controller 24. The local bus unit 28 transfers data at a sufficiently higher speed than the LAN system 22 and the bus unit 22c in the host computer.

The image data stored in the hard disk storage 21 is MPEG type compressed moving image data. The hard disk storage is remotely located.

A CPU unit 17 transfers the MPEG compressed moving image data from the hard disk storage 21 and stores the MPEG compressed moving image data in the MPEG decoder unit 23 using LAN system 22. CPU unit 17 works together with the remote computer 22a to accomplish the transfer.

The MPEG decoder unit 23 expands the inputted MPEG compressed moving image data. The MPEG decoder unit 23 provides a predetermined amount of expanded image data to the waiting signal generator 23b when the image data expansion of a predetermined unit of data is complete.

The waiting signal generator 23b generates a waiting signal during a predetermined period when the waiting signal generator 23b detects the completion of the expansion of the predetermined unit amount of image data.

The predetermined unit amount of the image to be expanded may be designated by the number of picture elements of the expanded digital image data. The MPEG decoder 23a temporarily stops expansion processing during the period which the waiting signal generator 23b is generating a waiting signal.

The predetermined unit amount of image data is designated in the MPEG decoder unit 23a by CPU unit 17. As noted above, the predetermined unit amount identifies the end of processing and the period that the waiting signal is generated by the waiting signal generator 23b.

The image data which is output by the MPEG decoder unit 23 is inputted at a high speed into the graphic memory controller 24 through the local bus unit 28. The graphic memory controller 24 writes the image data in the frame memory unit 15.

The I/O access unit 24a and the accessing address controller 24b may also be placed in a wait state by the waiting signal generator 24c after image data has been output by the MPEG decoder 23. That is, it is possible to place the I/O access unit 24a and the accessing address controller 24b in a wait state using the waiting signal generator 24c. Thus, the MPEG decoder unit 23 and the graphic memory controller 24 may perform in or out of synchronization for expanding a predetermined amount of the MPEG compressed moving image data and for writing a predetermined amount of the image data to the frame memory unit 15, respectively.

Thus, according to the second exemplary embodiment, it is possible to slow replay or accelerate replay of the MPEG compressed moving image data by increasing or decreasing the waiting signal generating period of the waiting signal generator 23b. The MPEG compressed image may also be replayed in real time.

It is also possible to switch the image, which is stored in the frame memory unit 15, to an MPEG moving image in or out of synchronization with the replay speed in real time, slow replay, or fast replay of the MPEG compressed moving image data. Thus, an added special effect of image switching can be produced.

Although the waiting signal generator 23b is used as an expansion speed control, a variable frequency generator which controls the operating frequency of the MPEG decoder 23a can be used for expansion speed control.

Similarly, although the waiting signal generator 24c is used as a writing speed control, a variable frequency generator which controls the operating frequency of the I/O access unit 24a and the accessing address controller 24b can be used as the writing speed control.

Third Exemplary Embodiment

Figure 3B:
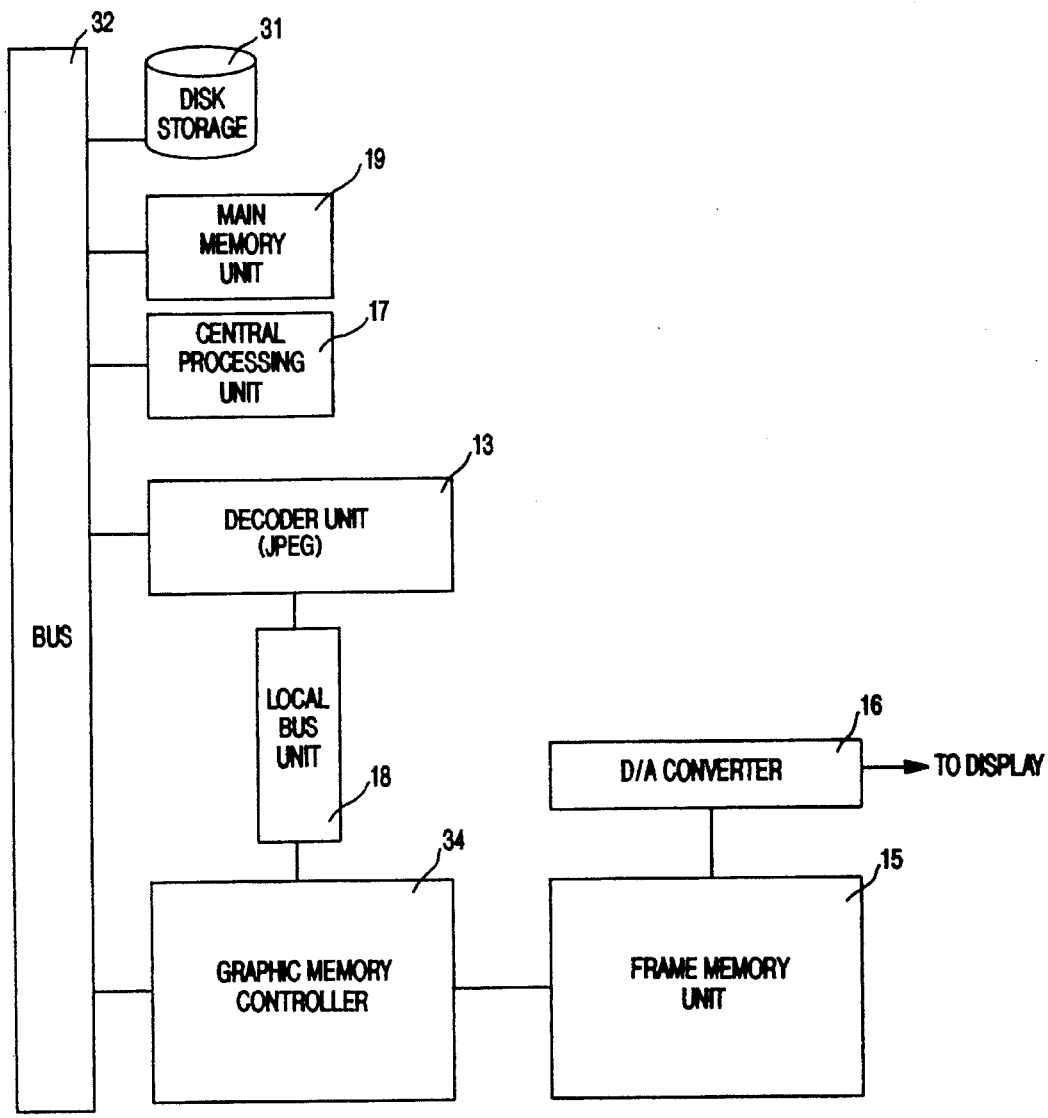
FIGS. 3a–3b are block diagrams of a visually effective image switching apparatus in accordance with a third exemplary embodiment of the present invention.
Figure 3A:
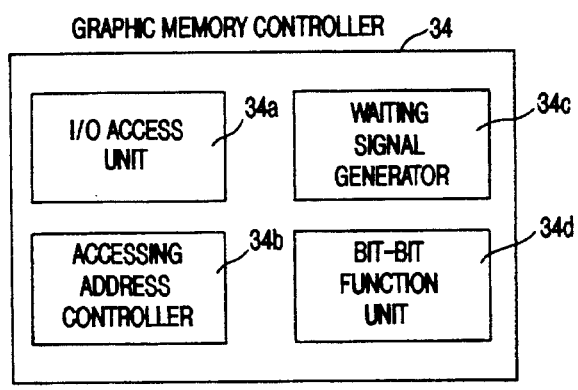

FIGS. 3a–3b are block diagrams of a visually effective image switching apparatus in accordance with a third exemplary embodiment of the present invention.

A CD ROM storage device 31 is provided for storing JPEG compressed still image. Also provided is a graphic memory controller 34 which includes an I/O access unit 34a an accessing address controller 34b, a waiting signal generator 34c and a bit-boundary block transfer (bit-blt) function unit 34d. The bit-blt function unit 34d at high speed transfers and writes a block of memory data corresponding to an arbitrary part of the image data stored in frame memory unit 15. In other words, the bit-blt function unit 34d replaces the picture in the frame memory unit 15. The bit-blt function unit 34d is used when a picture is displayed simultaneously or on an original picture. It functions as a logic operation with regard to a particular position on a bit map memory or as a high speed transfer function.

Bus unit 12 of the computer, JPEG decoder unit 13 frame memory unit 15, D/A converter 16, CPU unit 17, local bus unit 18 and main memory unit 19 are similar to those units having similar reference numerals discussed in reference to the first exemplary embodiment of the present invention.

In accordance with the third exemplary embodiment of the present invention, it is possible to transfer (i.e. copy and paste) a part of or a whole region of the image data stored in the frame memory unit 15 into frame memory 15 by providing a bit-blt function unit 34d in the graphic memory controller 34. Accordingly, for example, a part of or the whole region may be moved to a different location in the frame.

The third exemplary embodiment uses a similar processing procedure as the first exemplary embodiment. The image data expanded at the JPEG decoder unit 13 is written in the frame memory unit 15 through the graphic memory controller 34. In the third exemplary embodiment, the image data in the frame memory unit 15 can be overwritten by transferring the image data of one region of the image data to a different region. The transfer is performed in the frame memory unit 15 using the bit-blt function unit 34d.

For example, first image data is transferred to a region in the frame memory unit 15 which already has stored image data corresponding to the left half of a screen using the bit-blt function unit 34d. Next, the left half region of the image is designated as a writable region of the frame memory unit 15 by the accessing address controller 34b. At the same time, the JPEG compressed still image data is expanded in the JPEG decoder unit 13. The image data expanded at the I/O access unit 34a is then written in the frame memory unit 15. The image written into the frame memory unit 15 appears on the left half of the screen because the writing region is restricted by the accessing address controller 34b. The timing of each unit is controlled by the CPU unit 17. Thus, a picture switching special effect is produced by image synthesis, in which the image data stored in the frame memory is moved.

As for the compression method of the compressed image data, a JPEG method was adopted in the first and the third exemplary embodiments and an MPEG type was adopted in the second exemplary embodiment. However, a similar effect may be obtained using any other compression method for the three exemplary embodiments.

In addition, a memory unit may be provided for exclusively storing the writing region information or the writing region information can be read from an external storage device such as a magneto-optical disk storage or a hard disk storage.

It is more preferable to execute buffering of the compressed image data by a main memory unit of a computer when the compressed image data is transferred to the decoder.

Buffering can be easily realized in an conventional computer since the amount of compressed image data is small when compared to the original image data.

The buffering memory may be an exclusive unit attached to the compressed image data expanding unit such as the JPEG or MPEG decoder units.

Although a CPU unit of a computer is used for timing control in the first, second and third exemplary embodiments, microcomputer chips may be substituted for the CPU unit. Thus, it would be possible to assemble a unit without a separate CPU unit 17.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A visually effective image switching apparatus comprising:

compressed image data expanding means, responsive to a timing signal, for expanding first and second compressed image data signals corresponding to respective first and second images and outputting respective first and second expanded image data signals, frame memory means for storing the first expanded image data a signal in all of an address space and for subsequently storing said second expanded image data signal in a first partial portion of all of said address space, image data writing means, responsive to said timing signal, for writing said first expanded image data signal outputted from said compressed image data expanding means to all of said address space in said frame memory means and for subsequently writing to said address space said second expanded image data signal outputted from said compressed image data expanding means without rewriting any of said first expanded image data signal to said address space, wherein said second expanded image data signal is written to said first partial portion of all of said address space, data transferring means, responsive to said timing signal, for transferring the output of said compressed image data expanding means to said image data writing means writing region controlling means, responsive to said timing signal, for providing a plurality of write addresses corresponding to said address space for said first and second expanded image data signals when said image data writing means writes said expanded image data signals in said frame memory means, and timing controller means for controlling each one of said compressed image data expanding means, said data transferring means, said image data writing means, and said writing region controlling means by producing said timing signal.

2. A visually effective image switching apparatus as recited in claim 1, further comprising:

expansion speed controlling means for controlling, for a specified period of time, the speed at which said compressed image data expanding means expands a predetermined amount of at least one of said first and second compressed image data signals, and writing speed controlling means for controlling the speed at which the image data writing means writes at least one of the first and second expanded image data signals into the frame memory means.

3. A visually effective image switching apparatus as recited in claim 1, further comprising:

block data transferring means for transferring a portion of at least one of the first and second expanded image data signals stored in the frame memory means.

4. A visually effective image switching apparatus according to claim 1, further comprising display means for displaying said first image from said first expanded image data signal stored in all of said address space and for continuously maintaining display of a portion of said first image from a portion of said first expanded image data signal stored in a second partial portion of all of said address space while simultaneously displaying at least a portion of said second image from a portion of said second expanded image data signal stored in said first partial portion of all of said address space.

5. A visually effective image switching apparatus comprising:

storing means for storing a compressed image data signal, compressed image data expanding means, responsive to said timing signal, or expanding first and second compressed image data signals corresponding to respective first and second images and outputting respective first and second expanded image data signals at an output, a bus means for transferring said compressed image data signal to said compressed image data expanding means, frame memory means for storing said first expanded image data signal in all of an address space and for subsequently storing said second expanded image data signal in a first partial portion of all of said address space, image data writing means, responsive to said timing signal, for writing said first expanded image data signal from said compressed image data expanding means to all of said address space in said frame memory means and for subsequently writing to said address space said second expanded image data signal outputted from said compressed image data expanding means without rewriting any of said first expanded image data signal to said address space, wherein said second expanded image data signal is written to said first partial portion of all of said address space, said image data writing means having an input, data transferring means, responsive to said timing signal, for connecting the output of said compressed image data expanding means to the input of said image data writing means, said data transferring means having a higher transfer speed than said bus means and having writing region controlling means for supplying a writing address when said image data writing means writes said expanded image data signal in said frame memory means, said writing region controlling means responsive to said timing signal, and timing controlling means for controlling said compressed image data expanding means, said data transferring means, said image data writing means, and said writing region controlling means by producing said timing signal.

6. A visually effective image switching apparatus according to claim 5, further comprising display means for displaying said first image from said first expanded image data signal stored in all of said address space and for continuously maintaining display of a portion of said first image from a portion of said first expanded image data signal stored in a second partial portion of all of said address space while simultaneously displaying at least a portion of said second image from a portion of said second expanded image data signal stored in said first partial portion of all of said address space.

* * * * *

UNITED STATES PATENT AND TRADE MARK OFFICE
CERTIFICATE OF CORRECTION

PATENT NO. : 5,576,736
DATED : November 19, 1996
INVENTOR(S) : Miwa et al.

It is certified that error appears in the above-identified patent and that said Letters Patent is hereby corrected as shown below:

On the cover page, item [56] References Cited, U.S. Patent Documents, add the following:

4,197,590    4/1980    Sukonick et al.

Column 7, line 50, delete "a".

Column 8, line 46, delete "a".

Signed and Sealed this

Twenty-ninth Day of April, 1997

*Attest:*

BRUCE LEHMAN

*Attesting Officer*    *Commissioner of Patents and Trademarks*